United States Patent [19]

Axelrod et al.

[11] Patent Number: 4,507,436

[45] Date of Patent: Mar. 26, 1985

[54] COMPOSITIONS OF POLYPHENYLENE ETHER RESIN AND POLY(TETRA-ALKYLATED BISPHENOL) HAVING REDUCED MELT VISCOSITY

[75] Inventors: Robert J. Axelrod, Glenmount; John R. Campbell, Clifton Park; Sai-Pei Ting, Delmar, all of N.Y.

[73] Assignee: General Electric Company, Pittsfield, Mass.

[21] Appl. No.: 457,630

[22] Filed: Jan. 13, 1983

[51] Int. Cl.$^3$ .............................................. C08L 53/00
[52] U.S. Cl. ....................................... 525/92; 525/67; 525/96; 525/905
[58] Field of Search ...................... 525/67, 905, 92, 96

[56] References Cited

U.S. PATENT DOCUMENTS

| | | | |
|---|---|---|---|
| Re. 31,165 | 3/1983 | Serini et al. ............................ | 525/67 |
| 3,933,941 | 1/1976 | Yonemitsu et al. .................. | 525/133 |
| 3,963,804 | 6/1976 | Yonemitsu et al. ................... | 525/67 |
| 4,048,133 | 9/1977 | Adelmann et al. ................. | 524/494 |
| 4,172,103 | 10/1979 | Serini et al. ............................ | 525/76 |
| 4,369,136 | 1/1983 | Robeson et al. ....................... | 525/67 |

Primary Examiner—Jacob Ziegler
Attorney, Agent, or Firm—Hedman, Gibson, Costigan & Hoare

[57] ABSTRACT

The melt viscosity of thermoplastic compositions of polyphenylene ether resin and rubber modified high impact polystyrene resin is significantly reduced by inclusion of a tetra-alkyl bisphenol polycarbonate resin. The resulting blend can be processed at lower temperatures, and, after molding, exhibits better UV color stability while retaining most important other physical properties. Both the compositions and a method of preparation are described.

10 Claims, No Drawings

COMPOSITIONS OF POLYPHENYLENE ETHER RESIN AND POLY(TETRA-ALKYLATED BISPHENOL) HAVING REDUCED MELT VISCOSITY

BACKGROUND OF THE INVENTION

As is well known, the polyphenylene ether resins (also sometimes referred to as polyphenylene oxide resins) constitute a family of engineering thermoplastics which have become increasingly useful as extrudable and moldable materials. These resins and methods of their preparation are described in numerous publications, including U.S. Pat. Nos. 3,306,874 and 3,306,875 (to Hay), and U.S. Pat. Nos. 3,257,357 and 3,257,358 (to Stamatoff).

The polyphenylene ether resins are known to be admixable with styrene resins to form compositions characterized by a single set of properties different from, and in a number of cases superior to those of each resin alone. Such blends have been disclosed by Cizek in U.S. Pat. No. 3,383,435.

Compositions of polyphenylene ether resin and styrene resin can be modified by the addition of a flame retardant agent, as taught by Haaf in U.S. Pat. No. 3,663,654, or by inclusion of elastomeric di- or triblock copolymeric impact modifiers, as revealed by Haaf in U.S. Pat. No. 4,277,575.

Other attempts have been made to upgrade the properties of polyphenylene ether-polystyrene blends. Yonemitsu et al., in U.S. Pat. No. 3,933,941, express a dissatisfaction with the fatigue resistance of such blends and propose the addition of minor amounts of certain aromatic polycarbonates, containing no more than two alkyl substituents on each aromatic ring in the polymer chain, to improve this property while maintaining good processability.

The use of polycarbonate resin with polyphenylene ether resin, and separately with polystyrene, has also been described in the art. Adelman et al., in U.S. Pat. No. 4,048,133 disclose glass reinforced thermoplastic molding compositions of aromatic polycarbonates and a small amount poly(2,6-dialkyl-1,4-phenylene oxide). Serini et al., in U.S. Pat. No. 4,172,103, teach the preparation of blends of polystyrene and polycarbonate of tetramethyl bisphenol-A.

While blends of tetramethyl bisphenol-A polycarbonate and rubber modified high impact polystyrene are known to have significantly better impact strength than the tetramethyl bisphenol-A polycarbonate alone, this improvement is obtained at the expense of heat distortion properties, which is undesirable.

INTRODUCTION TO THE INVENTION

The discovery has now been made of novel thermoplastic molding compositions, comprising a polyphenylene ether resin, a rubber modified high impact polystyrene resin and an aromatic polycarbonate which has been derived specifically from a tetra-alkyl substituted bisphenol. It has been found, in particular, that the melt viscosity of a blend of polyphenylene ether and rubber modified high impact polystyrene can be substantially reduced by adding minor but effective amounts of the poly(tetra-alkylated bisphenol), and as a result, the blend can be processed at lower temperatures with less risk of thermal damage and loss of properties.

The compositions of the invention, because of their properties, are especially useful where high heat distortion temperature (the minimum temperature at which a molded article begins to deform under load) and good flow properties are needed, such as when the compositions are being shaped into intricate and/or large structures, and also where good color stability upon prolonged exposure to light is important. The present compositions exhibit the improvement in impact resistance associated with blends of rubber modified high impact polystyrene and tetramethyl bisphenol-A polycarbonate, after molding, but they also possess significantly higher heat distortion temperatures.

DESCRIPTION OF THE INVENTION

The polyphenylene ether resins, component (a), useful in accordance with the present kinds of compositions are, as previously indicated, individually well known.

The preferred polyphenylene ethers are homo- or copolymers of the formula:

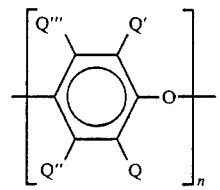

wherein Q, Q', Q" and Q''', are independently selected from the group consisting of hydrogen, halogen, hydrocarbon radicals, halohydrocarbon radicals, hydrocarbonoxy radicals and halohydrocarbonoxy radicals; and n represents the total number of monomer units and is an integer of at least about 20, and more usually at least 50.

Especially preferred is poly(2,6-dimethyl-1,4-phenylene)ether.

The polyphenylene ethers may be prepared by following the procedures described in the above mentioned Hay and Stamatoff patents.

The polyphenylene ether resin is employed in admixture or as a copolymer with a rubber modified, high impact polystyrene resin, component (b).

The terminology "rubber modified, high impact polystyrene", or "HIPS", is employed throughout this disclosure in its conventional specific sense to designate crystal polystyrene which has been rubber toughened to improve the impact resistance by adding an amount of a rubbery material to the styrene either before or after its polymerization. The resultant rubber modified material is essentially a graft interpolymer of polystyrene and rubber which, in the usual case, retains the original glossy or "crystal" appearance of the polystyrene.

The rubber modified, high impact polystyrenes have been commercially available for some time. Methods of their preparation are well known to those skilled in the art and thoroughly described in the literature.

As is known, various rubbery materials can be used to impact modify the polystyrene. Usually, these will be diene or diene containing rubbers, and most commonly, polybutadiene or a copolymer of butadiene with one or more other monomers.

Components (a) and (b) are utilizable in virtually all proportions, as is typical of these two materials. Preferably, however, the compositions will contain them in a weight ratio of (a):(b) within the range between 20:1 and 1:4.

The aromatic polycarbonate, component (c), contains units of the formula

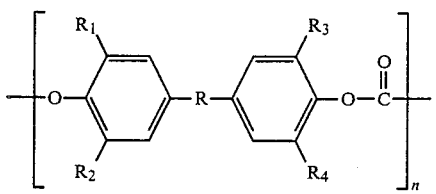

in which R is alkylidene having from 1 to 10 carbon atoms or cycloalkylidene having from 5 to 8 carbon atoms in the cyclic ring; $R_1$, $R_2$, $R_3$ and $R_4$ are the same or different and represent alkyl having from 1 to 3 carbon atoms, i.e., methyl, ethyl or propyl; and n represents the total number of monomer units and is an integer of at least 10, and more typically from 30 to 400.

They may be prepared by processes in which the corresponding tetra-alkyl substituted bisphenol compound is reacted with phosgene under polymerizing conditions. The procedures described in U.S. Pat. Nos. 3,879,348; 4,018,750; and 4,123,436 are helpful in this regard. The suitable bisphenolic starting materials are those of the formula

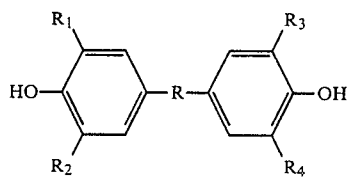

in which the substituents have the same meanings as above.

Examples of such compounds are as follows:
1,1-bis(3,5-dimethyl-4-hydroxyphenyl)-methane,
1,1-bis(3-methyl-5-ethyl-4-hydroxyphenyl)-methane,
1,1-bis(3,5-diethyl-4-hydroxyphenyl)-methane,
1,1-bis(3,5-diisopropyl-4-hydroxyphenyl)-methane,
1,1-bis(3,5-dimethyl-4-hydroxyphenyl)-ethane,
1,1-bis(3-methyl-5-ethyl-4-hydroxyphenyl)-ethane,
1,1-bis(3,5-diethyl-4-hydroxyphenyl)-ethane,
1,1-bis(3,5-diisopropyl-4-hydroxyphenyl)-ethane,
2,2-bis(3,5-dimethyl-4-hydroxyphenyl)-propane,
2,2-bis(3-methyl-5-ethyl-4-hydroxyphenyl)-propane,
2,2-bis(3,5-diethyl-4-hydroxyphenyl)-propane,
2,2-bis(3,5-diisopropyl-4-hydroxyphenyl)-propane.

Special mention is made of 2,2-bis(3,5-dimethyl-4-hydroxyphenyl)-propane and its corresponding end product, poly(3,5,3',5'-tetramethyl bisphenol-A) resin.

Component (c) is, as previously indicated, added in any amount effective to bring about the desired decrease in the melt viscosity of (a) and (b). Amounts as small as 0.5 part, per 100 parts of (a) and (b) combined, may be effective for this purpose. In preferred embodiments, the amount more typically will range between about 5 and about 50 parts by weight of (c), for each 100 parts of (a) and (b).

The compositions can and often do also contain one or more supplementary additives selected from among those materials conventionally employed with polyphenylene ether resins to improve the chemical and physical properties. Examples of such additives include mineral fillers, fibrous reinforcing agents, pigments, dyes, stabilizers, antioxidants, plasticizers, and so forth. These are preferably introduced in minor amounts ranging from 1 to 50% by weight of the total composition.

Preparation of the compositions of this invention may be accomplished in any convenient manner. In one procedure, the ingredients are tumbled to form a blend pre-mix, the pre-mix is extruded through a twin screw extruder at 450° to 600° F., and molded at an injection temperature of 450° to 550° F. (150° to 200° F. mold temperature).

Because of the reduced melt viscosity, processing at lower temperatures is possible, which lessens the danger that the compositions will undergo thermal damage and suffer a consequent loss in properties in the molded article.

The resulting molded articles are useful for those purposes generally known for polyphenylene ether resins and blends, including automative parts and trim, electrical housings, and household utensils and parts for appliances.

DESCRIPTION OF SPECIFIC EMBODIMENTS

The following examples illustrate the invention. These are intended as preferred or best embodiments only and should not be construed as a limitation on the scope of the invention.

EXAMPLE 1

This example illustrates the preparation of a tetramethyl bisphenol-A polycarbonate useful in compositions according to the invention.

A 30-liter resin vessel equipped with mechanical stirrer, condenser, pH probe and phosgene inlet was charged with 5.2 liters of deionized water, 11.2 liters of methylene chloride, 14.1 grams of 2,4,6-trimethylphenol and 84.4 grams of triethylamine. Tetramethyl bisphenol-A was added in the amount of 1,585 grams, with stirring, and a 50% solution of sodium hydroxide was introduced in an amount sufficient to bring the reaction mixture to a pH of 13. Phosgene was then added, with vigorous stirring, at a rate of 24 g/min, over a period of 120 minutes while sufficient sodium hydroxide was added periodically to maintain the pH at 13. At the conclusion of the reaction the polymer was separated, washed with dilute hydrochloric acid and water, and filtered. The polymer was isolated by use of steam precipitation in the standard manner, and the resultant powder was dried for several days at 100° C. under a vacuum equivalent to 5 mm of mercury.

EXAMPLES 2-4

Compositions according to the invention, noted below, were prepared by blending the ingredients noted below, extruding the blend at 540° F. in a 28 mm Werner-Pfleiderer twin screw extruder, and molding the extrudate at an injection temperature of 520° F. (160° F. mold temperature). Two controls as also noted below were prepared and molded. The results are shown in the Table, in which the abbreviations designate the following:

PPO ®-poly(2,6-dimethyl-1,4-phenylene ether) resin, General Electric Company.

T-PC-3,5,3',5'-tetramethyl bisphenol-A-polycarbonate resin, having an intrinsic viscosity of 0.49 deciliters per gram measured in solution in chloroform at 25° C., and a weight average molecular weight of 46,500 (Mw/Mn=3.0).

HIPS-Foster Grant's FG834 high impact rubber modified polystyrene, containing about 8% polybutadiene rubber.

scribed in Examples 2-4. The ingredients and test results are noted in the Table below.

TABLE 1

| EXAMPLE[a] | PPO | T-PC | HIPS | Notched Izod impact str., ft.lbs./in. | Gardner impact str., in.lbs. | Melt viscosity, poise, at 282° C., 1500 sec$^{-1}$ | HDT, °F. |
|---|---|---|---|---|---|---|---|
| A[b] | 40 | — | 60 | 2.0 | 125 | 2100 | 246 |
| 2 | 30 | 10 | 60 | 1.9 | 38 | 1470 | 244 |
| 3 | 20 | 20 | 60 | 1.6 | 16 | 1300 | 241 |
| 4 | 10 | 30 | 60 | 1.3 | 10 | 1150 | 242 |
| B[b] | — | 40 | 60 | 1.1 | 36 | 960 | 236 |

| EXAMPLE | Tensile strength, psi | Tensile yield, psi | Elong., % | Flexural str., psi | Flexural modulus, psi | Yellowness index | UV color stability[c] |
|---|---|---|---|---|---|---|---|
| A | 8100 | 9900 | 28 | 13,000 | 380,000 | 28 | 100 |
| 2 | 7600 | 9300 | 32 | 13,000 | 372,000 | 23 | 107 |
| 3 | 7600 | 9300 | 35 | 12,600 | 374,000 | 21 | 151 |
| 4 | 7000 | 8400 | 29 | 12,400 | 390,000 | 17 | 222 |
| B | 7600 | 9300 | 28 | 13,300 | 402,000 | 7 | — |

[a]Each blend also contained 0.15 part of zinc oxide, 0.15 part of zinc sulfide and 3 parts of titanium dioxide.
[b]Control experiment; not in accordance with invention.
[c]UV color stability was evaluated by aging the samples under fluorescent black light, then measuring the time to increment of yellowness index (Δγl = 1) of samples 2,3 and 4 in comparison with that of sample A (Δγl = 1 of sample A was defined as 100%).

EXAMPLES 5-8

The tetramethyl bisphenol-A polycarbonate prepared as described above was dried for two hours at 125° C. before blending with PPO and both rubber modified and crystal polystyrenes. All of the blends were prepared in the proportions given in the Table below and thoroughly mixed in a Henschel blender for 30 seconds. The resulting mixtures were melt blended on a 28 mm Werner-Pfleiderer twin screw extruder at 550° F. The extrudate was molded in a 3 oz. Newbury injection molding machine at 540° F. (180° F. mold temperature).

TABLE 2

| EXAMPLE[a] | PPO[c] | T-PC | HIPS[d] | PS[e] | Melt viscosity poise, at 282° C. 1500 sec$^{-1}$ | Heat dist. Temp., °F. |
|---|---|---|---|---|---|---|
| C[b] | — | 100 | — | — | 1300 | 332 |
| 5 | — | 40 | 50 | 10 | 1000 | 223 |
| D[b] | 40 | — | 50 | 10 | 2300 | 237 |
| 6 | 20 | 20 | 50 | 10 | 1600 | 226 |
| 7 | 30 | 10 | 50 | 10 | 1900 | 237 |
| 8 | 20 | 20 | 50 | 10 | 1400 | 228 |

| EXAMPLE | Notched Izod imp. str., ft.lb./in. | Gardner imp. str., in.lbs. |
|---|---|---|
| C | 0.6 | 2 |
| 5 | 2.8 | 100 |
| D | 3.0 | 140 |
| 6 | 3.2 | 125 |
| 7 | 4.0 | 130 |
| 8 | 1.9 | 30 |

[a]Each blend also contained 0.5 part of Irganox 1076, except for control A.
[b]Control experiment; melt viscosity of control C was measured at 315° C.
[c]PPO had an intrinsic viscosity of 0.51 dl/g in chloroform at 25° C.
[d]Amoco's 78U, polystyrene grafted to polybutadiene, overall rubber content about 20%
[e]Dylene 8G crystal polystyrene containing no rubber, from Sinclair Koppers, weight average molecular weight 395,000 (Mw/Mn = 4.1).

EXAMPLES 9-13

These examples illustrate further the effect of replacing a portion of HIPS in blends according to the invention with varying amounts of crystal polystyrene. The compositions were prepared using the procedure de-

TABLE 3

| EXAMPLE[a] | 9 | 10 | 11 | 12 | 13 |
|---|---|---|---|---|---|
| PPO | 20 | 20 | 20 | 20 | 20 |
| T-PC | 20 | 20 | 20 | 20 | 20 |
| FG-834 HIPS | 60 | — | — | — | — |
| AMOCO-78U HIPS | — | 30 | 40 | 50 | 60 |
| Shell's DP203 XPS[b] | — | 30 | 20 | 10 | — |
| Heat distortion temp., °F. | 230 | 235 | 235 | 235 | 237 |
| Izod imps., ft.lbs./in. | 1.7 | 2.0 | 2.6 | 3.6 | 4.3 |
| Gardner imp. in.-lb. | 51 | 27 | 42 | 147 | 153 |
| Tensile yield, psi | 9500 | 9900 | 8900 | 8300 | 7700 |
| Tensile str., psi | 7700 | 8400 | 7800 | 7600 | 7500 |
| Elong., % | 63 | 42 | 50 | 59 | 89 |
| Flex. mod., psi | 376,400 | 394,900 | 356,000 | 338,900 | 328,200 |
| Flex str., psi | 12,990 | 14,020 | 12,550 | 11,400 | 11,010 |
| Melt visc., poise 282° C., 1500 sec$^{-1}$ | 1400 | 1500 | 1600 | 1700 | 2000 |
| Gloss (45°) | 41 | 53 | 50 | 49 | 41 |
| Est. % rubber (phr) | 4.8 | 6 | 8 | 10 | 12 |

[a]Each blend also contained 0.15 part of zinc sulfide, 0.15 part of zinc oxide and 3 parts of titanium dioxide.
[b]Commercial high molecular weight crystal polystyrene, number average = 80,000.

As can be seen, the physical properties and especially the surface gloss and the impact strength can be varied by adjusting the ratio of HIPS and crystal polystyrene. In general, better gloss is achieved using a lower rubber content and a higher amount of crystal polystyrene in the blend.

EXAMPLES 14-19

These examples illustrate blends according to the invention which further contain an elastomeric linear block copolymer or radial teleblock copolymer to enhance the impact strength. Preparation was accomplished using the same procedure as in Examples 2-4. The ingredients and properties are shown in the Table below.

TABLE 4

| EXAMPLE[a] | 14 | 15 | 16 | 17 | 18 | 19 |
|---|---|---|---|---|---|---|
| PPO | 20 | 20 | 20 | 20 | 20 | 20 | described in Examples 2-4. The ingredients and test results are set forth below.

TABLE 5

| EXAMPLE[a] | 20[e] | 21 | 22 | 23 | 24 | 25 | 26 |
|---|---|---|---|---|---|---|---|
| PPO | 20 | 20 | 20 | 20 | 20 | 20 | 20 |
| T-PC | 20 | 20 | 20 | 20 | 20 | 20 | 20 |
| FG-834 | 60 | 60 | 60 | 60 | 60 | 60 | 60 |
| KG-1651 | 6 | 6 | 6 | 6 | 6 | 6 | 6 |
| K-50[b] | — | 6 | 10 | 14 | 6 | 10 | 14 |
| STB[c] | — | — | — | — | 0.5 | 0.5 | 0.5 |
| R-506C[d] | — | — | — | — | 0.5 | 0.5 | 0.5 |
| Example | 20 | 21 | 22 | 23 | 24 | 25 | 26 |
| Heat distortion temp., °F. | 230 | 202 | 192 | 176 | 201 | 189 | 176 |
| Izod imp. ft.lb./in. | 3.9 | 4.3 | 4.4 | 3.4 | 3.8 | 4.4 | 3.8 |
| Gardner imp. in.lb. | 110 | 135 | 140 | 115 | 115 | 120 | 125 |
| Tensile yield, psi | 8200 | 7500 | 7400 | 6800 | 7600 | 7100 | 6800 |
| Tensile str., psi | 7800 | 7300 | 7100 | 6700 | 7500 | 7100 | 6700 |
| Tensile Elong., % | 67 | 82 | 76 | 87 | 83 | 87 | 98 |
| Flex. mod., psi | 337,600 | 329,000 | 322,000 | 313,700 | 327,000 | 319,100 | 313,400 |
| Flex. str., psi | 10,300 | 9480 | 9130 | 8030 | 9540 | 8270 | 8240 |
| Melt visc., poise at 282° C., 1500 sec$^{-1}$ | 1500 | 1210 | 1090 | 910 | 1250 | 1120 | 950 |
| UL-94 (1/16") | Failed | Failed | V-1 | V-1 | Failed | V-1 | V-1 |

[a]Each blend also contained 0.15 part zinc sulfide, 0.15 part zinc oxide, 0.5 part diphenyl didecyl phosphite, 1.5 parts polyethylene and 3 parts titanium dioxide.
[b]Kronitex 50, FMC Corp., a triphenyl phosphate flame retardant agent containing one or more isopropyl groups
[c]Sodium salt of trichlorobenzene sulfonic acid
[d]Mixture of 20% Teflon and 80% bisphenol-A polycarbonate (General Electric's Lexan ®)
[e]Control in the sense that no flame retardant agent was present.

| EXAMPLE[a] | 14 | 15 | 16 | 17 | 18 | 19 |
|---|---|---|---|---|---|---|
| T-PC | 20 | 20 | 20 | 20 | 20 | 20 |
| FG-834 HIPS | 60 | 60 | 60 | 60 | 60 | 60 |
| KG-1651[b] | 4 | 8 | 12 | — | — | — |
| Solprene 411[c] | — | — | — | 4 | 8 | 12 |
| Heat distortion temp., °F. | 236 | 234 | 232 | 231 | 235 | 236 |
| Izod imp. ft.lb./in. | 2.9 | 3.3 | 3.9 | 2.8 | 3.3 | 3.6 |
| Gardner imp., in.-lb. | 111 | 135 | 204 | 123 | 150 | 174 |
| Tensile yld., psi | 9500 | 8600 | 8400 | 8900 | 8700 | 8100 |
| Tensile str., psi | 8200 | 7700 | 7500 | 7800 | 7700 | 7400 |
| Elong., % | 63 | 62 | 60 | 65 | 60 | 66 |
| Flex. mod., psi | 363,200 | 343,700 | 330,300 | 353,900 | 345,800 | 312,500 |
| Flex. str., psi | 12,920 | 11,990 | 11,450 | 12,480 | 11,790 | 10,780 |
| Melt visc., poise 282° C., 1500 sec$^{-1}$ | 1500 | 1580 | 1680 | 1530 | 1680 | 1700 |
| Gloss (45°) | 46 | 46 | 45 | 44 | 45 | 43 |
| Est. % rubber (phr) | 7.3 | 9.6 | 11.8 | 7.3 | 9.6 | 11.8 |

[a]Each blend again contained 0.15 zinc sulfide, 0.15 zinc oxide and 3 titanium dioxide.
[b]Shell's hydrogenated polystyrene-polybutadiene-polystyrene linear block copolymer.
[c]Phillips Petroleum's radial teleblock copolymer of styrene and butadiene.

EXAMPLES 20-26

These examples illustrate flame retardant blends in accordance with the invention. The compositions were prepared and molded under the same conditions as described in Examples 2-4. The ingredients and test results are set forth below.

All of the above mentioned patents and/or publications are incorporated herein by reference. Other variations and modifications of the invention are possible in the light of the above disclosure. For instance, instead of poly(2,6-dimethyl-1,4-phenylene ether), a copolymer such as poly(2,6-dimethyl-co-2,3,6-trimethyl-1,4-phenylene ether) may be used. Instead of a blend of the polyphenylene ether and HIPS, a copolymer of the two may be substituted. The flame retardant agent of Examples 15-21 may also be employed in the formulations of the other examples, with amounts adjusted accordingly. It is to be understood, that changes may be made in the particular embodiments shown without departing from the scope of the invention defined in the appended claims.

We claim:
1. A thermoplastic composition comprising:
    (a) a polyphenylene ether resin which is a homopolymer or copolymer having units of the formula

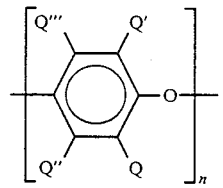

wherein Q, Q', Q", Q''' are independently selected from the group consisting of hydrogen, halogen, hydrocarbon radicals, halohydrocarbon radicals, hydrocarbonoxy radicals and halohydrocarbonoxy radicals; and n represents the total number of monomer units and is an integer of at least about 20;
(b) a rubber modified, high impact polystyrene resin; and
(c) a melt viscosity reducing amount of an aromatic polycarbonate consisting of a tetraalkyl substituted bisphenol polycarbonate having units of the formula

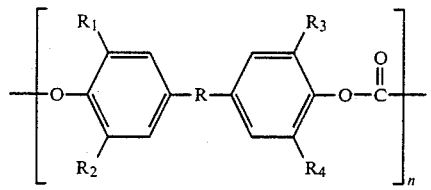

in which R is alkylidene having from 1 to 10 carbon atoms or cycloalkylidene having from 5 to 8 carbon atoms in the cyclic ring; $R_1$, $R_2$, $R_3$, and $R_4$ are the same or different and represent alkyl having from 1 to 3 carbon atoms; and n represents the total number of monomer units and is an integer of at least 10.

2. A composition according to claim 1, which further includes
   (d) an impact strength enhancing amount of an elastomeric styrene block co- or terpolymer.

3. A composition according to claim 1, which further includes
   (d) an impact strength enhancing amount of an elastomeric styrene block co- or terpolymer; and
   (e) a surface gloss improving amount of a non-rubber modified polystyrene resin.

4. A composition according to claims 1, 2 or 3, which contains from about 5 to about 50 parts of (c) for every 100 parts by weight of (a) and (b) combined.

5. A composition according to claims 1, 2 or 3, in which the weight ratio of (a) to (b) is in the range between 20:1 and 1:4.

6. A composition according to claims 1, 2 or 3, in which the polyphenylene ether resin is poly(2,6-dimethyl-1,4-phenylene ether).

7. A composition according to claims 1, 2 or 3, in which the polyphenylene ether resin is poly(2,6-dimethyl-co-2,3,6-trimethyl-1,4-phenylene ether).

8. A composition according to claims 1, 2 or 3, in which the aromatic polycarbonate is 3,5,3',5'-tetramethyl bisphenol-A polycarbonate.

9. A composition according to claims 1, 2 or 3, which also includes an effective amount of a flame retardant agent.

10. A process for reducing the melt viscosity of a composition of a polyphenylene ether resin and a rubber modified high impact polystyrene resin, comprising including in the composition a melt viscosity reducing amount of an aromatic polycarbonate consisting of a tetra-alkyl aubstituted bisphenol polycarbonate having units of the formula

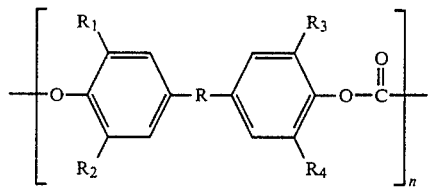

in which R is alkylidene having form 1 to 10 carbon atoms or cycloalkylidene having from 5 to 8 carbon atoms in the cyclic ring; $R_1$, $R_2$, $R_3$, and $R_4$ are the same or different and represent alkyl having from 1 to 3 carbon atoms; and n represents the total number of monomer units and is an integer of at least 10.

* * * * *